Jan. 13, 1942.   W. H. KRAUSE   2,269,537
UNITARY GUIDING AND LATCHING MEANS FOR AUTOMOBILE HOODS
Original Filed May 18, 1939   2 Sheets-Sheet 1
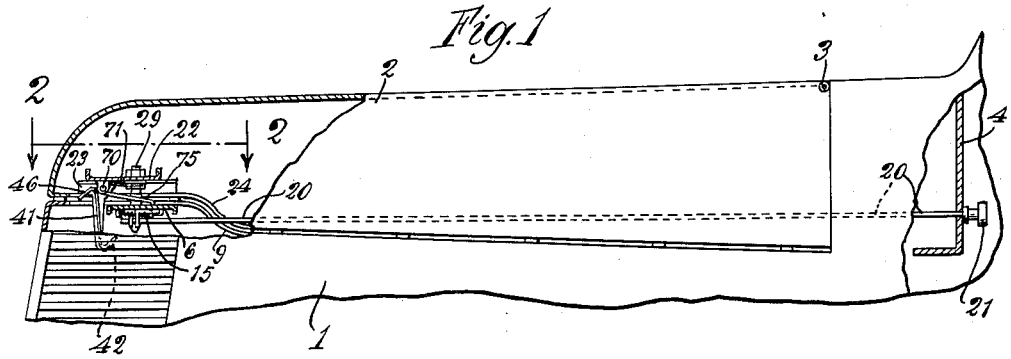
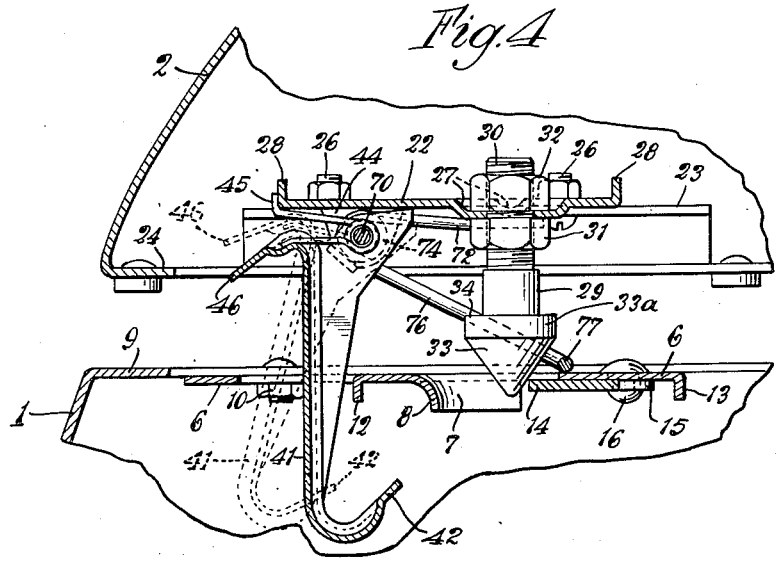
Inventor
Walter H. Krause
by Parker & Carter
Attorneys.

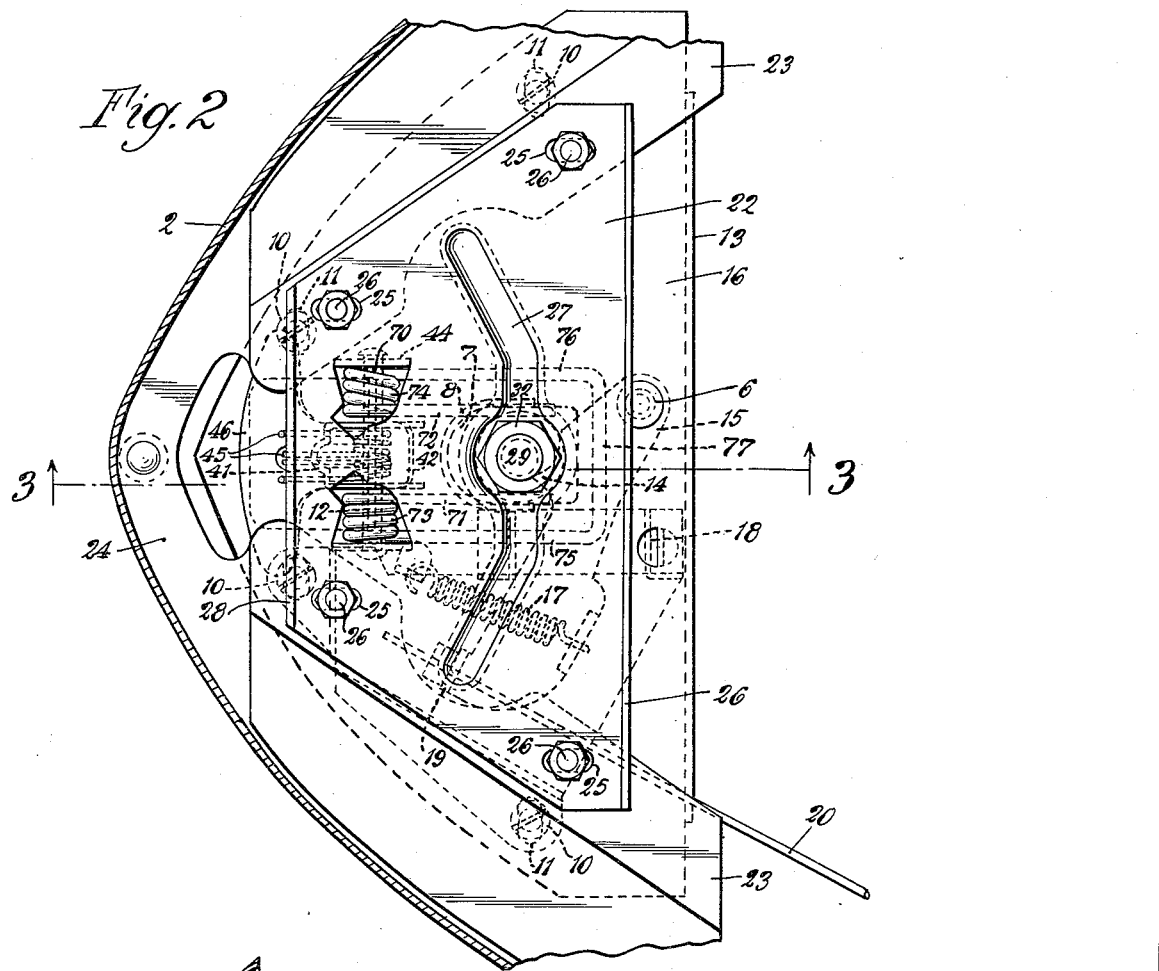
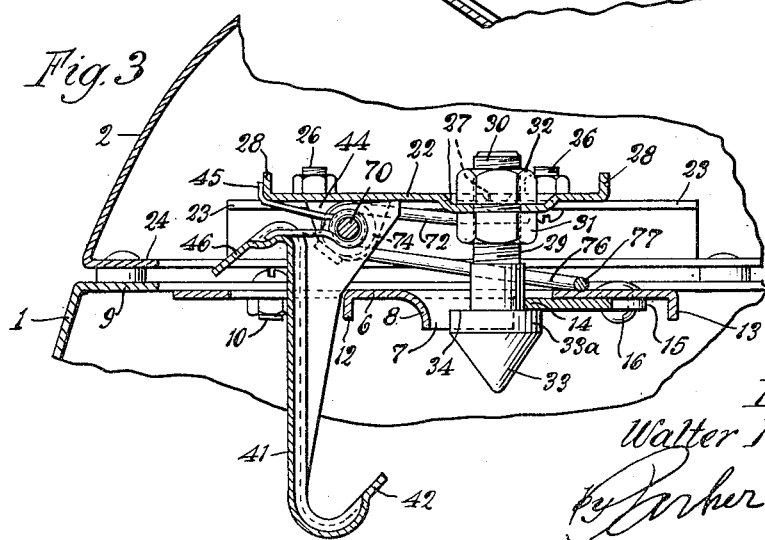

Patented Jan. 13, 1942

2,269,537

UNITED STATES PATENT OFFICE 2,269,537

UNITARY GUIDING AND LATCHING MEANS FOR AUTOMOBILE HOODS

Walter H. Krause, Chicago, Ill., assignor to Chicago Forging & Manufacturing Company, Chicago, Ill., a corporation of Illinois Original application May 18, 1939, Serial No. 274,315. Divided and this application December 1, 1939, Serial No. 307,052

3 Claims. (Cl. 292—1)

My invention relates to an improvement in latches and has for one purpose the provision of an improved latch for the closure of an automobile hood.

Another purpose is the provision of a latch assembly which shall be compact, easy to manufacture, and efficient in use.

Another purpose is the provision of means unitarily applicable to an automobile hood and hood closure having primary latching means, secondary safety latching means, and means for lifting the hood closure a predetermined distance in response to release of the primary latching means and prior to the release of the secondary safety latching means.

Another purpose is the provision of improved means for guiding the downward movement of the hood and latching means into latching position.

Other purposes will appear from time to time in the course of the specification and claims.

The present application is a division of my copending application Serial No. 274,315, filed in the United States Patent Office on May 18, 1939, now Letters Patent No. 2,227,144, dated December 31, 1940.

I illustrate my invention more or less diagrammatically in the accompanying drawings wherein:

Fig. 1 is a side elevation with parts in vertical longitudinal section;

Fig. 2 is a section on the line 2—2 of Fig. 1;

Fig. 3 is a section on the line 3—3 of Fig. 2; and

Fig. 4 is a section like Fig. 3, showing the parts in a different position.

Like parts are indicated by like characters throughout the specification and drawings.

Referring to the drawings, 1 generally indicates an automobile hood and 2 a closure therefor, transversely and horizontally hinged at its rear end as at 3. It will be understood, however, that the hinge shown is diagrammatic and that any suitable mounting for the rear end of the closure 2 may be employed. 4 generally indicates the instrument panel of the vehicle. It will be understood that in the claims, however, I may employ the term "hood" to indicate the hood closure 2, since it cooperates with the normally fixed portion 1 to constitute a complete hood or enclosure for the engine.

Mounted on the hood 1 is a member which I may call a bottom plate, generally indicated at 6 and shown in some detail for example in Figs. 2 and following. It is illustrated as having a transversely elongated aperture 7 surrounded by a downwardly turned flange 8. The plate 6 may be mounted in any suitable fashion upon the hood 1. I illustrate for example flanges 9 at each side of the hood 1 to which the plate 6 may be secured by bolts 10 or by any other suitable securing means.

Any suitable adjusting slots may be provided on the plate 6, as shown for example at 11 in Fig. 2. Preferably the plate 6 is mounted for lateral adjustment, the slots 11 being laterally or transversely elongated, whereby the aperture 7 may be aligned with the latching means below described. 12 indicates a downwardly turned flange adapted to receive the secondary or safety latching member below described. An additional rearward reinforcing flange 13 may be provided.

Mounted on the lower side of the plate 6 I illustrate a latch member 14 shown as formed of sheet metal and mounted on or forming part of a lever 15 pivoted as at 16 for rotation about a vertical pivot and urged by a spring 17 toward latching position. 18 is any suitable retaining member for the lever 15 which may be secured to the bottom of the plate 6. 19 is a downwardly projecting lug on the end of the lever 15 which is adapted to receive any suitable operating element or rod 20 which terminates in any suitable operating handle member diagrammatically shown at 21. The member 21 may be mounted on or adjacent the instrument panel 4 of the vehicle, in a position convenient to the driver's seat.

22 indicates a transversely extending plate mounted on the hood closure 2, for example upon intermediate brackets 23 secured upon the inturned lower edges or flanges 24 of the hood closure 2. It will be understood, of course, that any suitable securing and supporting means may be employed. I illustrate the member 22 as mounted for longitudinal adjustment and for that purpose I provide adjusting slots 25 through which pass any suitable securing bolts 26 whereby the member 22 is secured upon the upper inner flanges of the brackets 23. The transversely extending member 22 is downwardly offset as at 27, which offset may serve as a reinforcing means and is not in general essential. It is also provided with reinforcing flanges 28, shown as upwardly extending.

Mounted on the downwardly offset central portion 27 is a combined centering and locking keeper 29, which may for example be formed of rod stock screw threaded as at 30 and held in position by upper and lower nuts 31, 32. It has secured or formed at its lower end a spear head, or downwardly pointed cone 33 having a generally horizontal upper ledge or locking keeper 34 adapted to receive the lever or locking member 15, for example when the parts are in the position shown in Fig. 3.

I provide a secondary or safety latching means which includes a lever or hook 41 with a latching or hook portion proper 42. The hook member is pivoted as at 70 between ears 44 which may be downwardly struck from the upper transverse plate 22. Any suitable means may be employed for urging the hook 42 normally into vertical alignment with the securing lip 12. I illustrate for example a coil spring 45. The hook is provided also with a finger or handle piece 46, preferably formed integrally therewith, the purpose of which will later appear.

In order to raise the top hood member or closure when the latch is released I illustrate the following structure: A pin 70 performs the double function of serving as a pivot for the safety latch structure 41 and of supporting a lifting spring, including upper side elements 71, 72, which terminate in coils 73, 74, wound about the pivot 70, the coils being extended in the bottom members 75, 76, which are connected at their end as by the cross portion 77.

In the form herein shown I illustrate a one-piece wire spring. It will be understood, as shown in Fig. 3, that the bend 77 abuts against the lower plate 6, whereas the portions 71, 72 abut against the lower face of the downwardly offset 27 of the upper plate 22. Thus, the spring structure described normally tends to raise the closure 2 when the primary latch means is closed.

It will be realized that whereas I have described and illustrated a practical and operative device, nevertheless many changes may be made in the size, shape, number and disposition of parts without departing from the spirit of my invention. I therefore wish my description and drawings to be taken as in a broad sense illustrative and diagrammatic, rather than as limiting me to my precise showing. For example, whereas I have shown a specific spear shaped rod, it will be understood that variations in form, shape and material may be made without departing from the spirit of my invention. The use and operation of my invention are as follows:

I provide a compact structure for carrying a lock or latch which holds the closure portion 2 of the hood in final locked position, and an additional latch 41 which permits a limited upward movement of the member 2. When the member 2 is moved to the closed position, which is shown for example in Figs. 1 and 3, the lever 15, including the latch portion 14, is urged into locking position by its controlling spring, and the parts are firmly locked. When the operator releases the lever 15 by pulling on the handle 21, the spring means 71 to 77 are effective to raise the member 2 a predetermined distance. This distance is preferably sufficient to permit the hand of an operator to penetrate beneath the lower edge of the member 2 easily, to contact the handle 46 of the supplemental catch 41. The operator can then, by one unitary movement, lift the member 2 and at the same time rotate the handle 46 sufficiently to move the hook 42 out of vertical alignment with the abutment ledge 12 of the plate 6.

Note that the conic head 33 merges into a cylindrical portion 33a of a length sufficient to engage and provide a proper bearing with the downturned flange 8 of the plate 6. Note that this flange 8 does not entirely surround the aperture penetrated by the head 33, as the latch member 14 cuts in at one side or end of the aperture. The cylindrical portion 33a of the head 33 engages the flange 8 at diametrically opposed sides of the head. The length of the aperture 7 of the plate 6 permits a certain relative movement of the guiding head and the lower plate 6 in a longitudinal direction. This is important in connection with the upward and downward movement of the closure, and particularly where lever supports, compound hinges, or the like, are employed for the rear end of the hood.

The spring members 72, 76, etc., provide an easily applied and economic lifting means for thrusting the closure 2 up when the latch is released.

I claim:

1. In a hood latching arrangement wherein an encasing portion of the hood is adapted to be normally latched in closed position by a latch mechanism, and a secondary latch is provided, means for normally urging the hood to partially open condition in opposition to said latch mechanism, including a spring structure having a coiled portion extending about a transverse generally horizontal axis, and spring ends extending radially from said coil portion and opposed respectively to the encasing portion of the hood and to a relatively fixed portion of the vehicle on which the hood is mounted.

2. In a hood latching arrangement wherein an encasing portion of the hood is adapted to be normally latched in closed position by a latch mechanism, and a secondary latch is provided, means for normally urging the hood to partially open condition in opposition to said latch mechanism, including a spring structure having a coiled portion extending about a transverse generally horizontal axis, and spring ends extending radially from said coil portion and opposed respectively to the encasing portion of the hood and to a relatively fixed portion of the vehicle on which the hood is mounted, and a pivot pin about which said spring structure is coiled.

3. In a hood latching arrangement wherein an encasing portion of the hood is adapted to be normally latched in closed position by a latch mechanism, and a secondary latch is provided, means for normally urging the hood to partially open condition in opposition to said latch mechanism, including a spring structure having a coiled portion extending about a transverse generally horizontal axis, and spring ends extending radially from said coil portion and opposed respectively to the encasing portion of the hood and to a relatively fixed portion of the vehicle on which the hood is mounted, and a pivot pin about which said spring structure is coiled, said secondary latch being pivoted on said pivot pin.

WALTER H. KRAUSE.